United States Patent [19]

Kistler

[11] Patent Number: 4,996,882
[45] Date of Patent: Mar. 5, 1991

[54] MINIATURE STRAIN SENSOR

[75] Inventor: Walter P. Kistler, Redmond, Wash.

[73] Assignee: Kistler-Morse Corporation, Redmond, Wash.

[21] Appl. No.: 522,229

[22] Filed: May 11, 1990

[51] Int. Cl.$^5$ ............................................. G01B 7/161
[52] U.S. Cl. .................................... 73/777; 73/862.65
[58] Field of Search ................ 73/777, 775, 776, 767, 73/862.65, 862.66, 862.67

[56] References Cited

U.S. PATENT DOCUMENTS 3,315,203 4/1967 Jacobson ........................... 73/862.67

FOREIGN PATENT DOCUMENTS 903941 8/1962 United Kingdom ............. 73/862.65

Primary Examiner—Jerry W. Myracle
Attorney, Agent, or Firm—Seed and Berry

[57] ABSTRACT

A strain sensor is provided which includes a base member and a pair of mounting points for mounting the base member to a support structure supporting a vessel for weighing the contents of the vessel. The base member defines a cylindrically shaped well located at the center of base member. The area of the base member within the well defines a pair of apertures symmetrically located on opposite sides of a central longitudinal axis of the base member. The base member also defines a pair of notches located on opposite edges of the base member which run parallel to the longitudinal axis of the base member. An axial strain sensing element is mounted in the well along the longitudinal axis of the base member for sensing the axial strain in the support structure. In addition, a transverse strain sensing element is mounted in the well perpendicular to the axial strain sensing element for detecting strain a direction transverse to the longitudinal axis of the base member.

20 Claims, 1 Drawing Sheet

MINIATURE STRAIN SENSOR

TECHNICAL FIELD

This invention relates to strain measuring devices, and more particularly, to miniature strain sensors for measuring the strain in a load supporting structure.

BACKGROUND OF THE INVENTION

Several methods and technologies have been developed for measuring the contents of large silos or bins used to store bulk materials such as minerals, coal, plastics, chemicals and the like. One approach is to determine the material level in the vessel through the use of mechanical devices or through ultrasonic sounding. Another method for measuring the contents of a large silo involves weighing the contents of the vessel. These methods become difficult and impractical, however, when the contents are stored in large, tall silos or other similarly large vessels.

Recently, bolt-on weighing has become a popular approach for measuring the contents of a vessel. This method consists of bolting strain sensors to the support structure of the vessel. The contents of a vessel can be determined from strain measurements taken from strain sensors coupled to the support structure of the vessel. By measuring the amount of axial strain in the support structure as material is added to or removed from the vessel, the weight of the material in the vessel can be determined. The use of strain sensors to weigh the contents of a vessel has several advantages over the level-sensing method. The strain sensors are positioned on the outer surface of the vessel support structure rather than inside of the vessel where the contents of the vessel may interfere with or damage the sensors. In addition, use of strain sensors requires no instruments or cabling inside the vessel, and the strain sensors can easily be installed and the service at ground level.

Strain sensors used in bolt-on weighing systems must be highly sensitive to changes in strain of the load structure, yet insensitive to temperature fluctuations. An increase in temperature of the support structure will cause the support structure to expand. Expansion of the support structure resulting from a change in temperature is unrelated to the change in weight of the material inside the vessel and thus should not be detected by the strain sensor. Therefore, strain sensors are generally made of the same material as the support structure to minimize any uneven expansion between the structure and the sensor. One of the bolt-on weighing systems commonly used today is shown in U.S. Pat. No. 4,064,744.

Some severe problems have developed, however, in utilizing bolt-on weighing. It has been found that strain sensors used in bolt-on weighing can be adversely affected by factors external to the sensor or the support structure. For example, although the sensors themselves are carefully temperature-compensated, rapid temperature changes that occur between night and day or between sunny and cloudy conditions can produce large, temporary shifts in the weight readings. These shifts occur because the thermal mass of sensor differs from the thermal mass of the structure; therefore, a change in external temperature may change the temperature of the strain sensor at a different rate than the corresponding change in temperature of the support structure. Accordingly, a temperature differential may develop between the structure and the sensor, simulating a strain which the sensor detects and includes on the sensor readout.

Another problem in obtaining accurate strain measurements through bolt-on weighing is that the sensor must be designed so that it can easily be imbedded inside the structure and located at a "nodal point" in the stress pattern, at the place of stress reversal as explained in Kistler & Nachtigal, "Errors Encountered When Using Leg-Mounted Strain Sensors to Measure Vessel Contents" in the proceedings of the Powder & Bulk Solids Conference, May 1989.

Yet another problem encountered in bolt-on weighing systems is that the sensor must be inexpensive to produce since many sensors are required to obtain accurate weight measurements.

SUMMARY OF THE INVENTION

It is a primary objective of the present invention to provide a strain sensor suitable for bolt-on weighing applications that has a high strain sensitivity, yet a low sensitivity to temperature changes.

Another object of the invention is to provide a strain sensor having a thermal mass that is as small as possible so that it will rapidly follow temperature changes in the supporting structure.

Still another object of the invention is to provide a strain sensor capable of being imbedded into a support structure near its neutral bending plane.

Another object of the invention is to provide a strain sensor that is simple to machine and easy to install.

Another object of the invention is to provide a strain sensor that is economical to manufacture.

The foregoing objects are achieved by providing a strain sensor which includes a base member having a generally rectangular cross section and a pair of mounting points for mounting the base member to a support structure that supports a vessel of material to be weighed. A well is centrally located on the base member, the area of the base member which corresponds to the well having a thickness generally less than the thickness of the base member outside the well. The well defines at least one pair of apertures symmetrically located o opposite sides of a central longitudinal axis of base member to minimize the cross sectional area corresponding to the well and concentrate the strain to be measured. The strain sensor also includes at least one pair of symmetrical notches located at the sides of the base member which run parallel to the longitudinal axis of the base member. Mounted within the well is an axial strain sensing element oriented along the longitudinal axis of the base member for sensing the axial strain in the support structure, and a transverse strain sensing element positioned perpendicular to the axial strain sensing element for detecting strain a direction transverse to the longitudinal axis of the base member

DETAILED DESCRIPTION OF THE INVENTION

Figure 1:
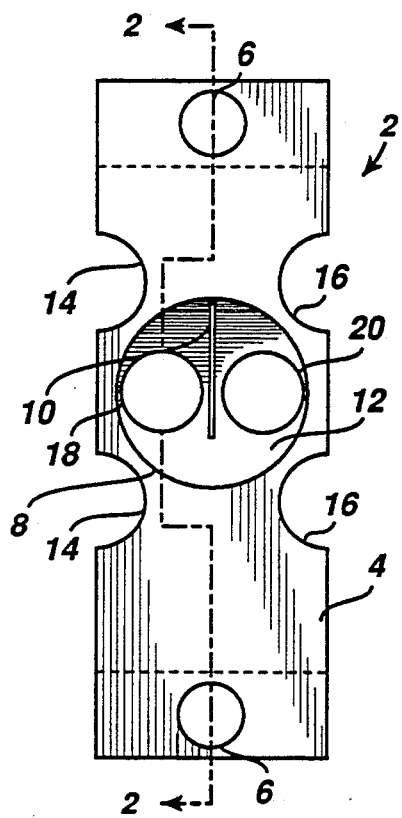
FIG. 1 is front plan view of one embodiment of the strain sensor.
Figure 2:
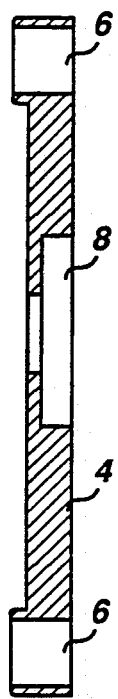
FIG. 2 is an offset sectional view of the strain sensor taken along the line 2—2 of FIG. 1.

FIGS. 1 and 2 show a miniature strain sensor 2 according to the present invention. One embodiment of the strain sensor 2 comprises base member 4 preferably made of a thin strip of steel. The base member 4 is generally rectangular in shape and has a thin rectangular cross section (FIG. 2). The base member 4 should preferably be no more than one-half of an inch in width and no more than one-eighth of an inch in thickness.

The base member 4 is provided with a pair of mounting points 6 or other means for attaching the strain sensor 2 to a weight bearing structure. The precise manner of mounting the strain sensor 2 can be by welding, bolting or any other attaching methods known to persons skilled in the art. Generally, the strain sensor 2 is mounted to a support structure in the position as illustrated in FIG. 1; that is, the mounting points 6 are positioned in the plane which includes with the vertical axis of the support structure.

The center area of the base member 2 forms a well 8 wherein an axial strain sensing element 10 and a transverse strain sensing element 12 are mounted. As shown in FIG. 2, the thickness of the base member corresponding to the well 8 is less than the thickness of the other portions of the base member 4. The purpose of the well 8 is to concentrate the strain in the well 8 so that the strain sensor 2 can detect changes in strain of the support structure more precisely. Preferably, the well 8 is cylindrically shaped so that the strain of the support structure will be translated to the well 8 evenly to prevent inaccurate strain measurements. It is conceivable, however, that the well 8 could be made of other shapes to effect the desired strain concentration.

Referring to FIG. 1, the longitudinal sides of the base member 4 form symmetrically opposed pairs of notches 14, 16 located adjacent the well 8. The notches 14, 16 are preferably semi-circular in shape but other shapes may also be used. The notches 14, 16 serve to concentrate the strain in the well in a symmetrical manner. Preferably, at least one pair of notches is machined in the sides of the base member 4, but additional pairs of notches may also be included to further concentrate the strain, as shown in FIG. 1.

The axial strain sensing element 10 is positioned in the well 8 to coincide with the longitudinal axis of the base member 4. The axial strain sensing element 10 measures the axial strain in the support structure which changes in proportion to the amount of material in the vessel supported by the support structure.

Referring again to FIG. 1, the transverse strain sensing element 12 is mounted in the well 8 perpendicular to the axial strain sensing element 10. The transverse strain sensing element 12 accounts for fluctuations in transverse strain of the support structure so that the strain sensor 2 can obtain an accurate strain measurement. While FIG. 1 shows the transverse strain sensing element 12 mounted below the axial strain sensing element 10, it is understood that the transverse strain sensing element 12 could likewise be mounted above or across the axial strain sensing element 10.

The well area 8 also defines a pair of apertures 18, 20 located equidistantly on each side of the axial strain sensing element 10 and immediately above the transverse sensing element 12. Although the apertures 18, 20 are shown as being circular, other shapes may also be used. The purpose of the apertures 18, 20 is to minimize the cross sectional area of the base member 4 surrounding the axial strain sensing element 10 and the transverse strain sensing element 12 and concentrate the strain so that it can be measured more precisely. In addition, a reduction in the material adjacent the strain sensing elements reduces the thermal mass of the sensor so that the strain sensor 2 can respond quickly to any temperature changes of the support structure or air surrounding the strain sensor 2, minimizing any adverse effects of differentials in strain between the structure and the strain sensor 2. The notches 14, 16, the apertures 18, 20, and the well 8 are easy to machine in the base member 4 which simplifies the manufacturing process.

Figure 3:
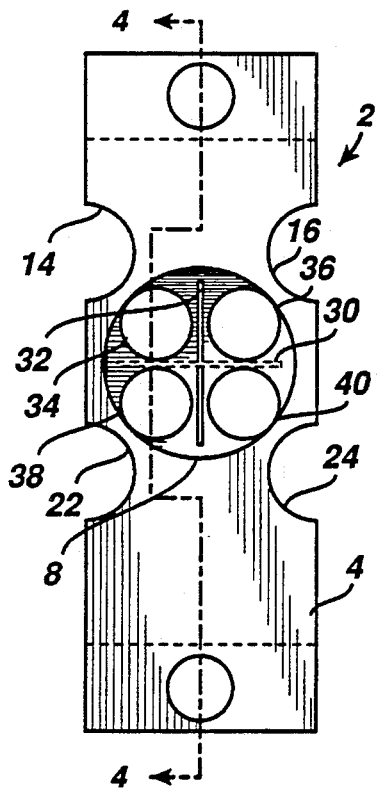
FIG. 3 is a front plan view of a second embodiment of the strain sensor.
Figure 4:
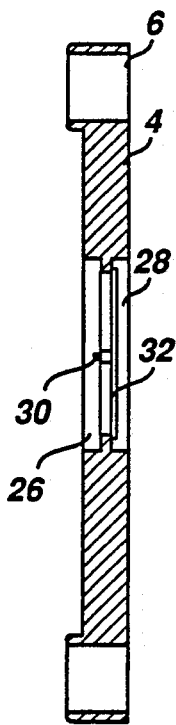
FIG. 4 is, an offset sectional view of the strain sensor taken along the line 4—4 of FIG. 3.

Referring now to FIGS. 3 and 4, a second, alternative embodiment of the strain sensor 2 includes a base member 4 and mounting points 6 which involve essentially the same characteristics as explained above with regard to FIGS. 1 and 2. In addition, the second embodiment of the strain sensor 2 includes notches 14, 16 defined by the base member 4 as explained above.

The second embodiment of the strain sensor further includes an additional pair of notches 22, 24 defined by the longitudinal sides of the base member 4. Notches 22, 24 are located below notches 14, 16. The notches 22, 24 serve to additionally concentrate the strain in the well 8 where the strain sensing elements are mounted.

With reference to FIG. 4, the base member 4 defines a pair of wells 26, 28 located in the center portion on opposite sides of the strain sensor 2. The wells 26, 28 are generally cylindrical in shape and also act to minimize the cross sectional area of base member adjacent the strain sensing elements, yet allow the strain from the support structure to be distributed evenly along the axial and transverse directions of the strain sensor 2.

Mounted in the well 26 is a transverse strain sensing element 30 positioned along the central horizontal axis of the well 26. Mounted in the opposite well 28 is an axial strain sensor 32 positioned along the central longitudinal axis of the well 28. As shown in FIG. 3, the axial strain sensor 32 and the transverse strain sensor 34 are positioned on opposite sides of the base member 4 to form a cross, each strain sensor bisecting the base member 4 in the longitudinal and transverse directions, respectively. The advantages and purpose of the strain sensors are the same as discussed above with respect to the embodiment shown in FIGS. 1 and 2.

Another feature of the alternative embodiment of FIGS. 3 and 4 is the presence of equidistantly spaced apertures 34, 36, 38, 40 defined by an area of the base member 4 within the wells 26, 28. The apertures 34, 36, 38, 40 are located in each of the four quadrants defined by the longitudinal and transverse axes running through the center of the circular area of the base member 4 within the wells 26, 28.

The strain sensor embodiment shown in FIGS. 3 and 4 is capable of measuring the strain in the support structure more precisely than the embodiment of FIGS. 1 and 2 because of the reduced cross sectional area of the base member 4 adjacent the axial strain sensing element 32 and the transverse strain sensing element 30. The disadvantage of the second embodiment, however, is that it will be more expensive to manufacture and assemble because both surface areas of the structure must be worked on consecutively.

The strain sensor 2 must be relatively small so that it can be embedded in the support structure at the neutral bending plane of the structure without degrading the strength of the structure. A precise strain measurement requires that the strain sensor 2 be located at the neutral bending plane so that the sensor 2 will detect axial compressive strain changes in the structure rather than strain due to lateral bending of the structure. In addition, the strain sensor must be relatively small so that it has a small thermal mass and can follow any changes in temperature of the structure virtually simultaneously.

Figure 5:
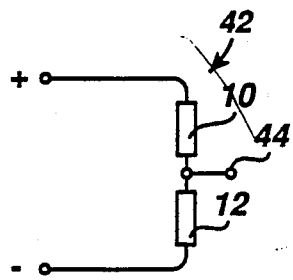
FIG. 5 is a schematic of a half-bridge circuit of the strain sensor.

FIG. 5 shows an electrical schematic diagram including the axial strain sensing element 10 and the transverse sensing element arranged in a half-bridge circuit 42. The circuit 42 is connected to an output signal 44. The strain sensing elements may consist of metal foil strain gages or semiconductor strain gages. Generally, semiconductor strain gages are preferable because they are highly sensitive and capable of precise strain measurement readings. To obtain the highest degree of stability and longevity, the semiconductor crystals are preferably glass-fused to the body.

When the strain sensor 2 is loaded, the strain sensing elements 10, 12 are strained in opposite directions. As a result, the resistances of the strain sensing elements 10, 12 change in opposite directions thus altering the voltage at terminal 44. However, temperature induced strains in the well 8 deform the strain sensing elements 10, 12 in the same direction. As a result, the resistances of the strain sensing elements change in the same direction so that the voltage at terminal 44 is unchanged. The sensor 2 is thus substantially insensitive to thermal strains.

I claim:

1. A strain sensor, comprising:
   a base member having a generally rectangular cross section;
   mounting means for mounting the base member to a support structure that supports a vessel containing a material to be weighed;
   a cylindrically shaped well located on a central longitudinal axis of the base member, the base member within the well having a thickness generally less than the thickness of the base member outside the well, an area of the base member within the well defining a first pair of apertures symmetrically located on opposite sides of the central longitudinal axis of the base member to minimize the cross sectional area of the base member within the well and concentrate the strain experienced by the base member;
   at least one pair of opposed, symmetrical notches defined by the base member located adjacent the well on the sides of the base member for concentrating the strain in the well; and
   sensing means mounted inside the well between the apertures for sensing the strain transmitted to the strain sensor by the support structure so that the weight of the material inside the vessel can be determined.

2. A strain sensor according to claim 1 wherein the base member defines two pairs of opposed, symmetrical notches located adjacent the well on the sides of the base member for concentrating the strain in the well.

3. A strain sensor according to claim 1 wherein the sensing means comprises an axial strain sensing element mounted in the well along the longitudinal axis of the base member for sensing the axial strain in the support structure and a transverse strain sensing element positioned in the well perpendicular to the axial strain sensing element for detecting strain a direction transverse to the longitudinal axis of the base member.

4. A strain sensor according to claim 3 wherein the axial strain sensing element and the transverse strain sensing element comprise metal strain gauges.

5. A strain sensor according to claim 4 wherein the axial strain sensing element and the transverse strain sensing element are connected in a half-bridge circuit.

6. A strain sensor according to claim 3 wherein the axial strain sensing element and the transverse strain sensing element comprise semiconductor crystals.

7. A strain sensor according to claim 6 wherein the semiconductor crystals are glass-fused to the base member.

8. A strain sensor according to claim 7 wherein the axial strain sensing element and the transverse strain sensing element are connected in a half-bridge circuit.

9. A strain sensor according to claim 1 wherein the apertures are circular shaped so that the strain of the support structure is evenly distributed across the cross sectional area of the base member inside the well.

10. A strain sensor according to claim 1 wherein the notches are semi-circular shaped so that the strain of the support structure is evenly distributed across the cross sectional area of the base member inside the well.

11. A strain sensor according to claim 1 wherein the apertures are circular shaped and the notches are semi-circular shaped so that the strain of the support structure is evenly distributed across the cross sectional area of the base member inside the well.

12. A strain sensor according to claim 1, further comprising a second pair of apertures defined by the well being located on opposite sides of the longitudinal axis of the base member and symmetrically opposed to the first set of apertures with respect to a central transverse axis of the base member for concentrating the strain to be sensed within the well.

13. A strain sensor according to claim 12 wherein the base member defines two pairs of notches located on the sides of base member running parallel to the longitudinal axis of the base member to concentrate the strain in the well.

14. A strain sensor, comprising:
   a base member having a generally rectangular cross section;
   a pair of mounting points for mounting the base member to a support structure that supports a vessel containing a material, the mounting points being positioned at opposite ends of the base member;
   a cylindrically shaped well located on a central longitudinal axis of the base member, the area of the base member within the well having a thickness generally less than the thickness of the base member outside the well, the area of base member within the well defining a pair of apertures symmetrically located on opposite sides of the central longitudinal axis of base member to minimize the cross sectional area of the base member within the well and concentrate the strain experienced by the base member;
   two pairs of notches defined by the base member, the notches being located along the sides of the base member which lie in the plane corresponding to the longitudinal axis of the base member;
   an axial strain sensing element mounted in the well along the longitudinal axis of the base member between the apertures for sensing the axial strain in the support structure; and
   a transverse strain sensing element positioned in the well perpendicular to the axial strain sensing element for detecting strain a direction transverse to the longitudinal axis of the base member.

15. A strain sensor according to claim 14 wherein the axial strain sensing element and the transverse strain sensing element comprise metal strain gauges.

16. A strain sensor according to claim 15 wherein the axial strain sensing element and the transverse strain sensing element are connected in a half-bridge circuit.

17. A strain sensor according to claim 14 wherein the axial strain sensing element and the transverse strain sensing element comprise semiconductor crystals.

18. A strain sensor according to claim 17 wherein the semiconductor crystals are glass-fused to the base member.

19. A strain sensor according to claim 18 wherein the axial strain sensing element and the transverse strain sensing element are connected in a half-bridge circuit.

20. A strain sensor according to claim 14, further comprising:
 a second pair of apertures defined by the well being located on opposite sides of the longitudinal axis of the base member and symmetrically opposed to the first set of apertures with respect to a central transverse axis of the base member; and
 a second pair of notches located below the first pair of notches on the sides of the base member parallel to the longitudinal axis of the base member for concentrating the strain in the well.

* * * * *